United States Patent [19]

Yamanoi et al.

[11] Patent Number: 5,608,698
[45] Date of Patent: Mar. 4, 1997

[54] DISK PLAYER WHICH AVOIDS SOUND FAILURE RESULTED FROM RETRY OF DATA READING

[75] Inventors: Katsuaki Yamanoi; Isamu Miura; Tomoko Miyagawa, all of Kawagoe, Japan

[73] Assignee: Pioneer Electronic Corporation, Tokyo, Japan

[21] Appl. No.: 556,051

[22] Filed: Nov. 9, 1995

[30] Foreign Application Priority Data

Nov. 11, 1994 [JP] Japan .................................. 6-277317

[51] Int. Cl.$^6$ .................................................... G11B 7/00
[52] U.S. Cl. .............................. 369/54; 369/60; 369/48
[58] Field of Search ................................ 369/47, 48, 53, 369/54, 58, 60, 32, 84, 49

[56] References Cited

U.S. PATENT DOCUMENTS

| | | | |
|---|---|---|---|
| 4,816,928 | 3/1989 | Sasaki et al. ........................ | 360/35.1 |
| 5,325,347 | 6/1994 | Sako ..................................... | 369/48 |
| 5,457,672 | 10/1995 | Shinada et al. ..................... | 369/47 |
| 5,463,607 | 10/1995 | Roth et al. .......................... | 369/60 |
| 5,487,047 | 1/1996 | Oka ..................................... | 369/32 |
| 5,491,592 | 2/1996 | Aramaki et al. .................... | 360/59 |
| 5,504,728 | 4/1996 | Yokota et al. ...................... | 369/58 |

Primary Examiner—Thang V. Tran
Attorney, Agent, or Firm—Morgan, Lewis and Bockius LLP

[57] ABSTRACT

A disk player reads data read from a disk after temporary storage in a memory and outputs the read data and is capable of preventing the memory from becoming empty by a retry operation for reading data, thereby avoiding a sound failure. When an address whose data is not correctly readable is present on a disk, the address information of that address is stored, and when the same disk is played again, the data reading operation for the new address is performed before the amount of remaining data in the memory becomes too small at the time the next reading address is address whose data is unreadable based on the address information. When at least the same disk is played again, therefore, the memory may not become empty, thus preventing a sound failure from occurring.

3 Claims, 10 Drawing Sheets a : DATA READING OPERATION
b : PAUSE OPERATION
c : SEARCHING OPERATION
d : JUMPING OPERATION a : DATA READING OPERATION
b : PAUSE OPERATION
c : SEARCHING OPERATION
d : JUMPING OPERATION

FIG.9
(a)
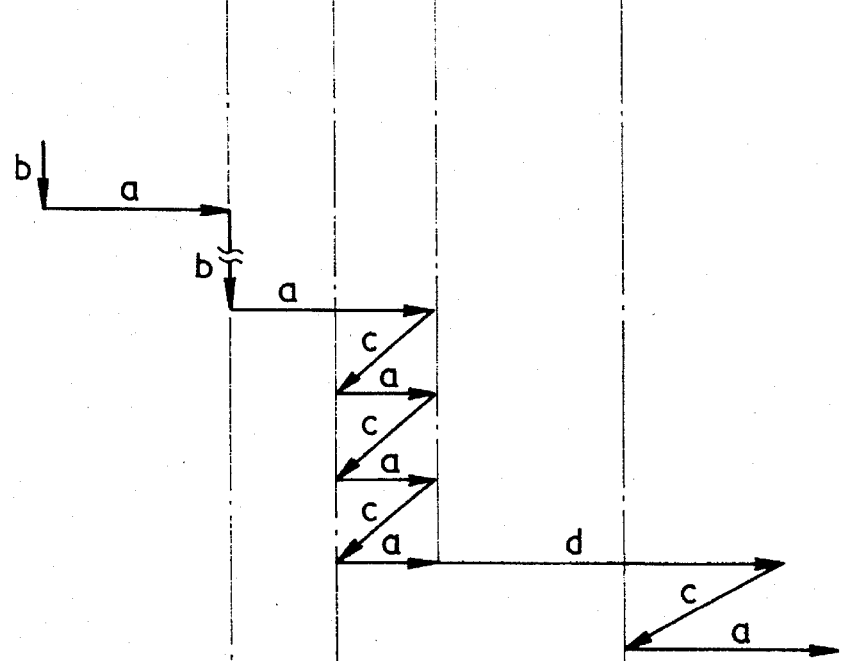
(b)
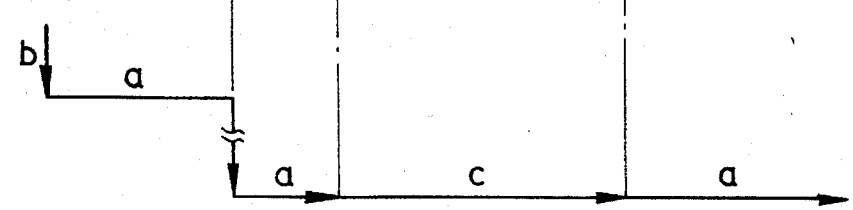
(c)

DISK PLAYER WHICH AVOIDS SOUND FAILURE RESULTED FROM RETRY OF DATA READING

BACKGROUND OF THE INVENTION

1. Field of the Invention

The present invention relates to a disk player which plays disks such as a mini disk (MD) and a compact disk (CD).

2. Description of Background Information

For disks on which digital audio data is recorded, conventional mini disk players are configured to write temporarily, in a playback mode, data read by the pickup, into a memory via an EFM (Eight to Fourteen Modulation) decoder, and then reads the data written in the memory in the writing order at a speed slower than the writing speed. The read data is sent through an audio compression decoder and a D/A (Digital/Analog) converter to be output as an analog audio signal. The address of each sector on a disk like a mini disk is written at the header portion in that sector, and data is read sector by sector, which is a unit of data block, in accordance with the addresses, i.e., data is read address by address. The data in the memory which has been read is to be erased.

When data cannot be read from a disk or read data is in error, the reading operation is performed again or a retry operation is executed starting at the address whose data has not been correctly read. Unless correct data is written in the memory, this retry operation continues until the amount of remaining data already written in the memory becomes equal to or smaller than a given value.

When the amount of remaining data in the memory becomes equal to or smaller than the given value, the retry operation is stopped and a new data reading operation is executed at the next address whose data is readable.

FIG. 1 illustrates such a reading operation in the form of a control flowchart for a system controller in a mini disk player. The system controller instructs the reading of data at an address N on a disk (step S1) and determines if this data reading operation has been carried out (step S2). When the data reading operation has been executed, the system controller determines if the data read from the disk (or the read data) is correct (step S3). Since the EFM decoder detects an error in the read data by the CIRC (Cross Interleave Reed-Solomon Code), the system controller can determine if the read data is correct from the result of that detection. When the read data is correct, the system controller instructs the writing of the read data into the memory (step S4), and determines if a program to be played back has been completed (step S5). When the program to be played back has not ended, the address N on the disk is incremented by "1" and the resultant address is set as a new address N (step S6) after which the flow returns to step S1. When the program to be played back has ended, this routine is terminated.

The instruction to read data at the address N in step S1 is associated with the amount of remaining data in the memory. When data which is equal to or greater in amount than a predetermined value A has not been read into the memory and there is therefore some data remaining in the memory, the control by the system controller is in a pause mode. When the amount of remaining data becomes equal to or smaller than a predetermined value B (A>B), the pause mode is released and the data reading operation is to be actually instructed.

When it is determined in step S2 that the data reading operation has not been executed, the system controller determines if the amount of remaining data in the memory is equal to or greater than a predetermined value X (B>X) (step S7). When the read data is determined to be in error in step S3, the flow also proceeds to step S7. When the amount of remaining data in the memory is equal to or greater than the predetermined value X in step S7, the system controller allows the pickup to search for the address N (step S8), and then the processing returns to step S1 to read data at the address N. When the amount of remaining data in the memory is smaller than the predetermined value X, on the other hand, the system controller causes the pickup to jump the addresses to search for an address whose data is readable (step S9), and sets this address as the address N (step S10) after which the system controller returns to step S1.

The part (a) in FIG. 2 indicates the data recorded positions that are specified by addresses N-2, N-1, N, ..., and N+m on a disk. In the illustrated case, correct data is not readable in the range from the address N to the address N+m-. The part (b) in FIG. 2 indicates the chronological flow of the operation by the pickup to access at the data recorded positions in the part (a) in FIG. 2 in accordance with the operation illustrated in FIG. 1.

FIG. 3 shows the relationship between the chronological operational flow illustrated in FIG. 2 and the amount of remaining data in the memory. After a pause mode b is released at an earlier address than the address N-2, a data reading operation a is performed up to the address N-2. When data accumulated amounts to the predetermined value A which is close to the memory capacity, no further data can be written in the memory so that the disk player enters the pause mode. When the amount of data in the memory is reduced to the predetermined value B, the data reading operation starts again. After the data reading operation for the address N-2 is completed, the pause mode b is temporarily started and then the data reading operation starts again. When the data read position reaches the address N, the reading operation cannot be performed properly so that the address N is detected by a searching operation c after which the reading operation a for the address N starts again. If the data at the address N is not actually readable, a retry operation is performed to repeat the data reading operation a and the searching operation c. When the amount of remaining data in the memory becomes smaller than the predetermined value X, the reading operation a for the address N is interrupted and a jumping operation d takes place to search out an address whose data is readable. When the address N+m is detected as the address whose data is readable as illustrated, the data reading operation a starts.

When the amount of remaining data in the memory becomes smaller in the retry operation and some cause like vibration occurs to inhibit the reading operation then, this conventional mini disk player cannot read the address whose data is actually readable, before the memory becomes empty. This results in a sound failure, causing an unpleasant listening condition. This problem is not inherent to mini disk players alone, but it is rather common to the other conventional disk players including a compact disk player, which have a memory for temporary storage of data read from a disk by the pickup in a playback mode and execute a retry operation when data reading is failed.

OBJECTS AND SUMMARY OF THE INVENTION

Accordingly, it is a primary objective of the present invention to provide a disk player capable of preventing a memory from becoming empty by a retry operation to read data, thereby avoiding a sound failure.

According to one aspect of this invention, there is provided a disk player which comprises:

reading means for reading data, recorded on a disk, for each predetermined block affixed with address information;

a memory for storing data read by the reading means;

memory control means for writing data into the memory when the data is correctly read, block by block, from the disk by the reading means, and, upon incorrect reading of data, inhibiting writing of the data into the memory and reading data from the memory at a speed slower than a writing speed;

means for detecting an amount of data still remaining in the memory after being written therein;

read control means for controlling the reading means in such a way as to read again data which has not been read correctly when the amount of remaining data is equal to or greater than a first predetermined value, and controlling the reading means in such a way as to read data at a new address when the amount of remaining data becomes smaller than the first predetermined value; and means for determining if it is a first playback for the disk, the read control means including, means for storing, as an error data address, address information for data which has not been read correctly before the amount of remaining data becomes smaller than the first predetermined value when it is the first playback, and means for controlling the reading means in such a way as to read again data which has not been read correctly in a different playback from the first playback, when an address whose data has not been read correctly is equal to the error data address stored at a time of the first playback and the amount of remaining data is equal to or greater than a second predetermined value larger than the first predetermined value, and controlling the reading means in such a way as to read data at a new address when the amount of remaining data becomes smaller than the second predetermined value.

A disk player according to another aspect of this invention comprises:

reading means for reading data, recorded on a disk, for each predetermined block affixed with address information;

a memory for storing data read by the reading means;

memory control means for writing data into the memory when the data is correctly read, block by block, from the disk by the reading means, and, upon incorrect reading of data, inhibiting writing of the data into the memory, and reading data from the memory at a speed slower than a writing speed;

means for detecting an amount of data still remaining in the memory after being written therein;

read control means for controlling the reading means in such a way as to read again data which has not been read correctly when the amount of remaining data is equal to or greater than a predetermined value, and controlling the reading means in such a way as to read data at a new address when the amount of remaining data becomes smaller than the predetermined value; and means for determining if it is a first playback for the disk, the read control means including, means for storing address information for data which has not been read correctly before the amount of remaining data becomes smaller than the predetermined value when it is the first playback, means for determining if next data is correctly readable based on the address information in a different playback from the first playback, and means for controlling the reading means in such a way as to read data at a new address without reading the next data when the next data has not been determined as being correctly readable.

According to the first aspect of this invention, when there is any address whose data cannot be correctly read on a disk, the reading operation is repeated until data for that address can be read correctly as long as the amount of remaining data in the memory is equal to or greater than a first predetermined value, and if the data cannot still be read correctly even after that, the address information of the data which cannot be read correctly is memorized. When the same disk is played again, at the time data at the next reading address is determined as being unreadable based on the address information, the reading operation is repeated until data for that address can be read correctly as long as the amount of remaining data in the memory is equal to or greater than a second predetermined value larger than the first predetermined value. If the data cannot still be read correctly even after that, the control proceeds to an operation for reading data at a new address.

According to the second aspect of this invention, when there is any address whose data cannot be correctly read on a disk, the reading operation is repeated until data for that address can be read correctly as long as the amount of remaining data in the memory is equal to or greater than a predetermined value, and if the data cannot still be read correctly even after that, the address information of the data which cannot be read correctly is memorized. When the same disk is played again, at the time data at the next reading address is determined as being unreadable based on the address information, the operation for reading data at the next reading address reading operation is not performed and the control proceeds to an operation for reading data at a new address.

BRIEF DESCRIPTION OF THE DRAWINGS

FIG. 9 is a diagram exemplifying the control operation in FIG. 8; and

DETAILED DESCRIPTION OF THE PREFERRED EMBODIMENTS

Preferred embodiments of the present invention will be now described with reference to the accompanying drawings.

Figure 4:
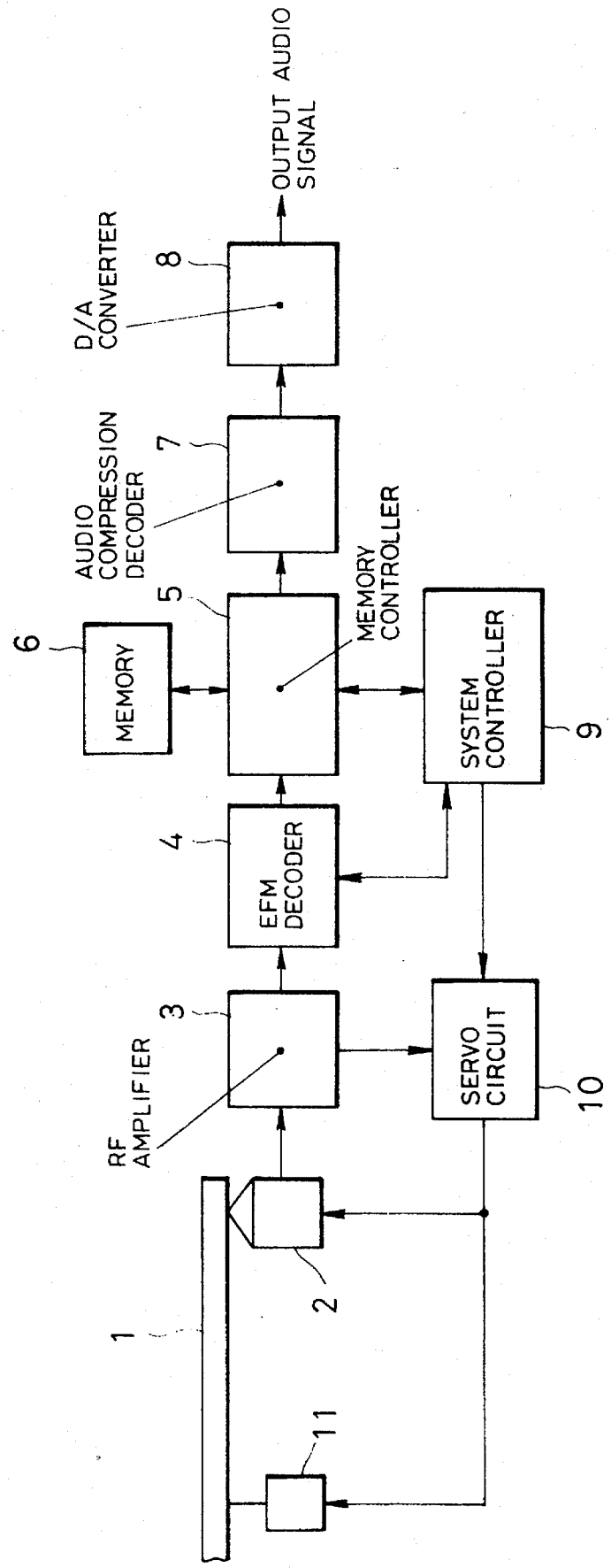
FIG. 4 is a block diagram showing one embodiment of this invention.

A mini disk player shown in FIG. 4 has an optical pickup 2 to read data recorded on a disk 1. The read signal is supplied via an RF amplifier 3 to an EFM decoder 4. The EFM decoder 4 corrects an error in the read signal by a CIRC technique, performs EFM demodulation on the corrected read signal and sends the resultant signal to a memory controller 5. The memory controller 5 controls the data writing and reading with respect to a memory 6, constituted of a RAM (Random Access Memory). The memory 6 has a capacity of, for example, 4 Mbits, and is accessed at a writing speed of 1.4 Mbit/sec and at a reading speed of 0.3 Mbit/sec, slower than the writing speed. The read data is erased from the memory 6. Data read from the memory controller 5 is supplied to an audio compression decoder 7. This decoder 7 serves to demodulate a digital audio signal which has been recorded in a compressed fashion by an audio compression technique called ATRAC (Adaptive TRansform Acoustic Coding). The digital audio signal obtained by the audio compression decoder 7 is converted by a D/A (Digital/Analog) converter 8 to an analog audio signal which is in turn output.

The EFM decoder 4 and the memory controller 5 are controlled by a system controller 9 constituted of a microcomputer. The system controller 9 also controls a servo circuit 10, which performs various servo controls such as spindle servo, tracking servo, focus servo and carriage servo. The servo circuit 10 obtains a servo signal from the read signal from the RF amplifier 3 to control the reading position and focusing of the pickup 2 and the rotational speed of a spindle motor 11. The spindle motor 11 rotates the disk 1.

Figure 1:
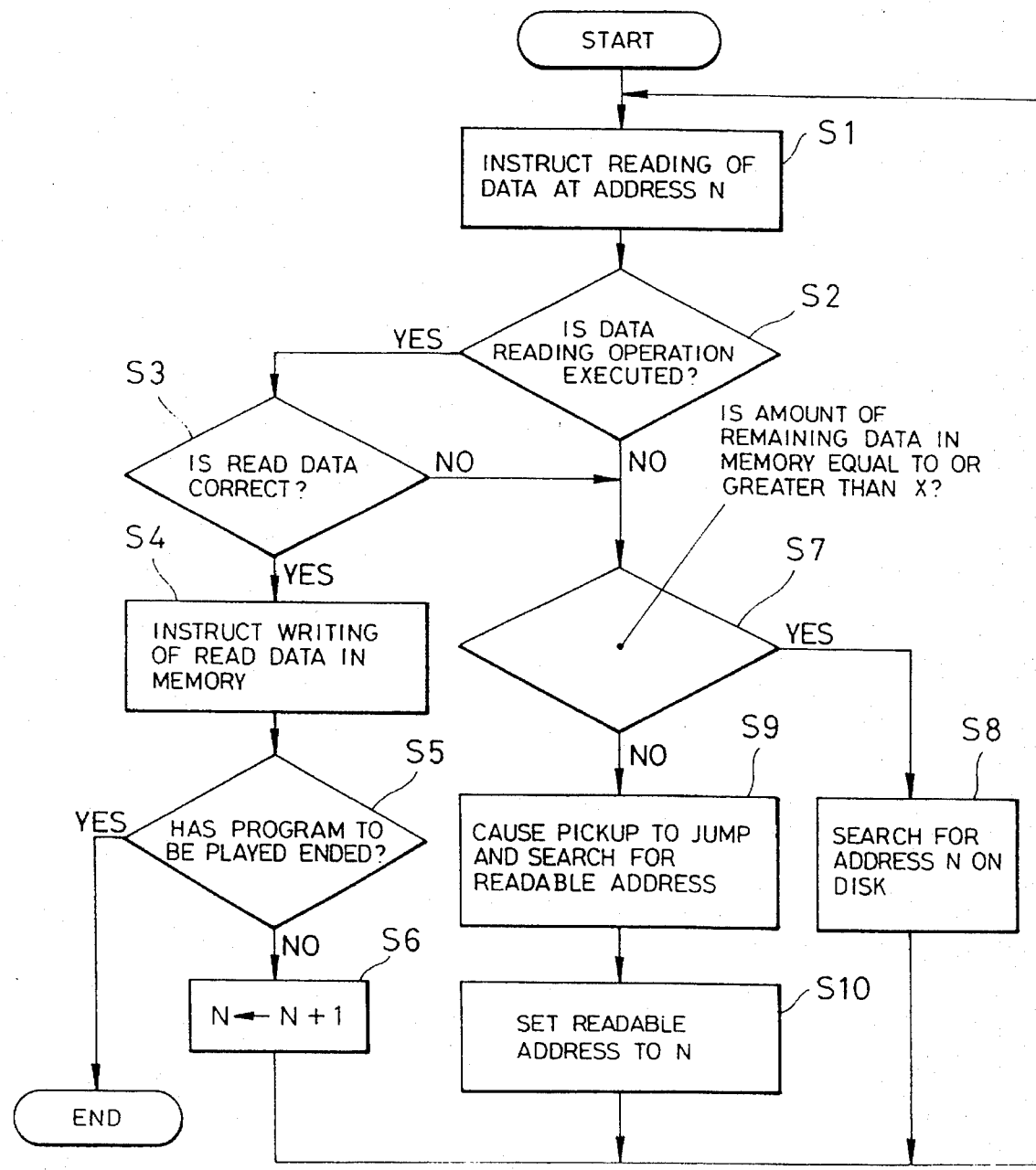
FIG. 1 is a flowchart for the conventional data read control operation.
Figure 5:
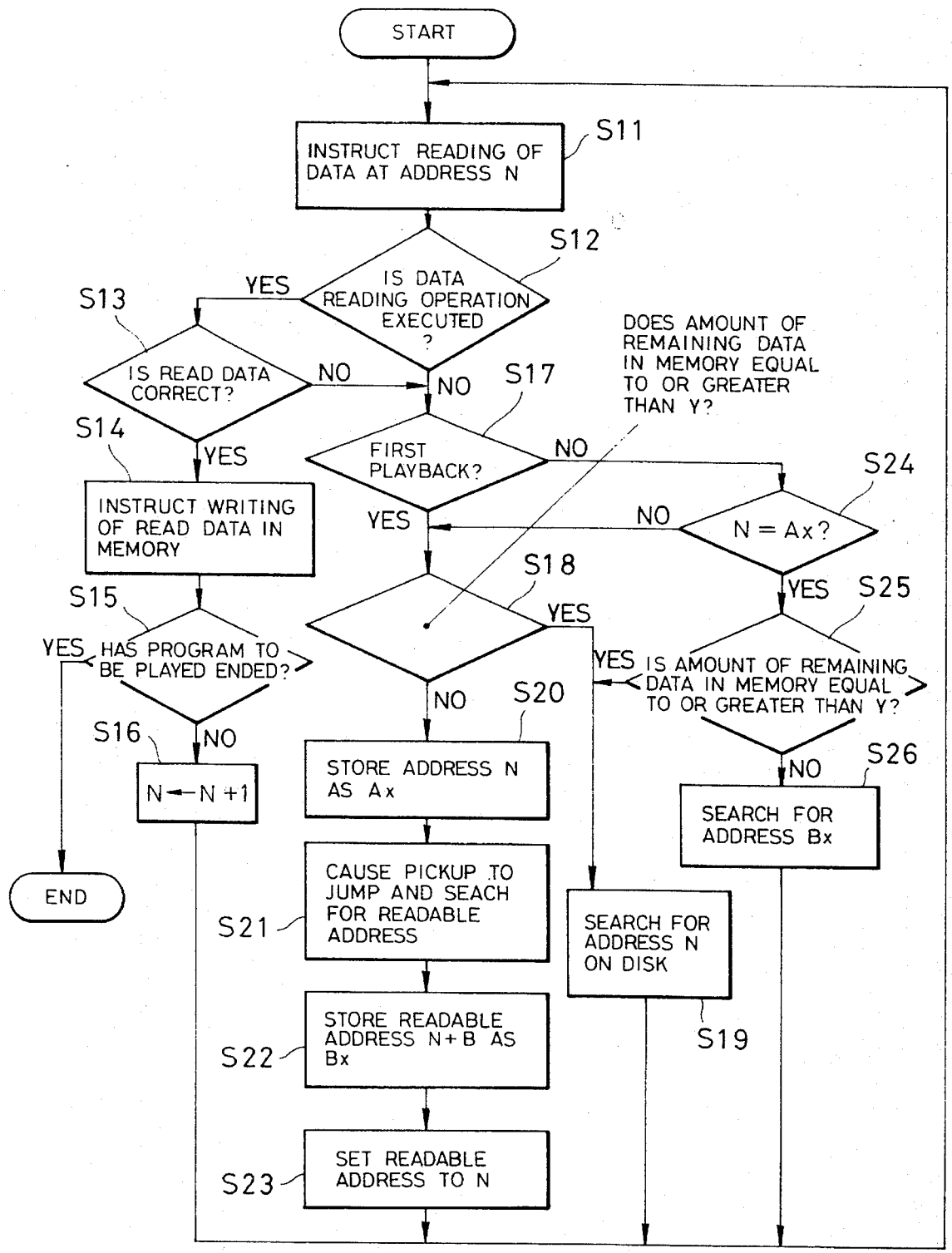
FIG. 5 is a flowchart for a data read control operation which is executed by a system controller in a player in FIG. 4.

A description will be now given of the operation for reading data from the disk 1 by this mini disk player in a playback mode. The system controller 9 instructs the reading of data at an address N on the disk 1 (step S11) and determines if this data reading operation has been executed (step S12) as illustrated in FIG. 5. When the data reading operation has been executed, the system controller 9 determines if the read data is correct (step S13). When the read data is correct, the system controller 9 instructs the memory controller 5 to write the read data into the memory 6 (step S14). The memory controller 5 writes the read data into the memory 6 in accordance with the writing instruction from the system controller 9. Then, the memory controller 5 determines if a program to be played back has ended (step S15). When the program to be played back has not ended, the address N on the disk 1 is incremented by "1" and the resultant address is set as a new address N (step S16) after which the flow returns to step S11. When the program to be played back has ended, this routine is terminated. The operation up to this point is the same as that of the conventional player shown in FIG. 1.

When it is determined in step S12 that the data reading operation has not been executed or it is determined in step S13 that the read data is in error, the system controller 9 determines if it is the first playback to the disk 1 (step S17). When the disk is played for the first time after being placed on the turntable (not shown), it is the first playback. When the same disk is played again and again while remaining on the disk, the playback is not the first playback. This can be checked by determining whether the disk to be played is the same or is changed from the TOC (Table Of Contents) recorded on the disk. In the first playback, it is determined if the amount of remaining data in the memory 6 is equal to or greater than a predetermined value X (step S18). When the amount of remaining data in the memory 6 is equal to or greater than the predetermined value X, the system controller 9 allows the pickup 2 to search for the address N (step S19), and then operation returns to step S11 to read data at the address N. When the amount of remaining data in the memory 6 is smaller than the predetermined value X, on the other hand, the address N whose data cannot be read correctly is stored as Ax (step S20). That is, Ax is written in a memory (not shown) in the system controller 9. Then, the system controller 9 causes the pickup 2 to jump the addresses to search for an address whose data is readable (step S21), stores the address N+m whose data is readable as Bx (step S22), and sets this address as the address N (step S23). After that, the processing returns to step S11.

When it is not determined in step S17 that the current playback is the first playback, i.e., when it is determined that the current playback is the second playback or any later playback, it is determined if the current read address N is identical to Ax (step S24). When N ≠ Ax, the address N whose data has not been read correctly this time is not the address whose data could not be read correctly in the first playback, so that the flow proceeds to step S18. When N=Ax, on the other hand, the address N whose data has not been read correctly this time is the address whose data could not be also read correctly in the first playback. In this case, it is determined if the amount of remaining data in the memory 6 is equal to or greater than a predetermined value Y (step S25). The predetermined value Y is greater than the predetermined value X. When it is determined that the amount of remaining data in the memory 6 is equal to or greater than the predetermined value Y, the system controller 9 proceeds to step S19 to allow the pickup 2 to search for the address N on the disk. After this, the system controller 9 returns its procedure to step S11 to read data at the address N. When it is determined that the amount of remaining data in the memory 6 is smaller than the predetermined value Y, however, the system controller 9 causes the pickup 2 to jump the addresses to search for the address Bx that has been stored in step S22 (step S26). In other words, the address portion whose data is not readable is jumped and data at the address Bx whose data is readable is read out in step S11.

Figure 6:
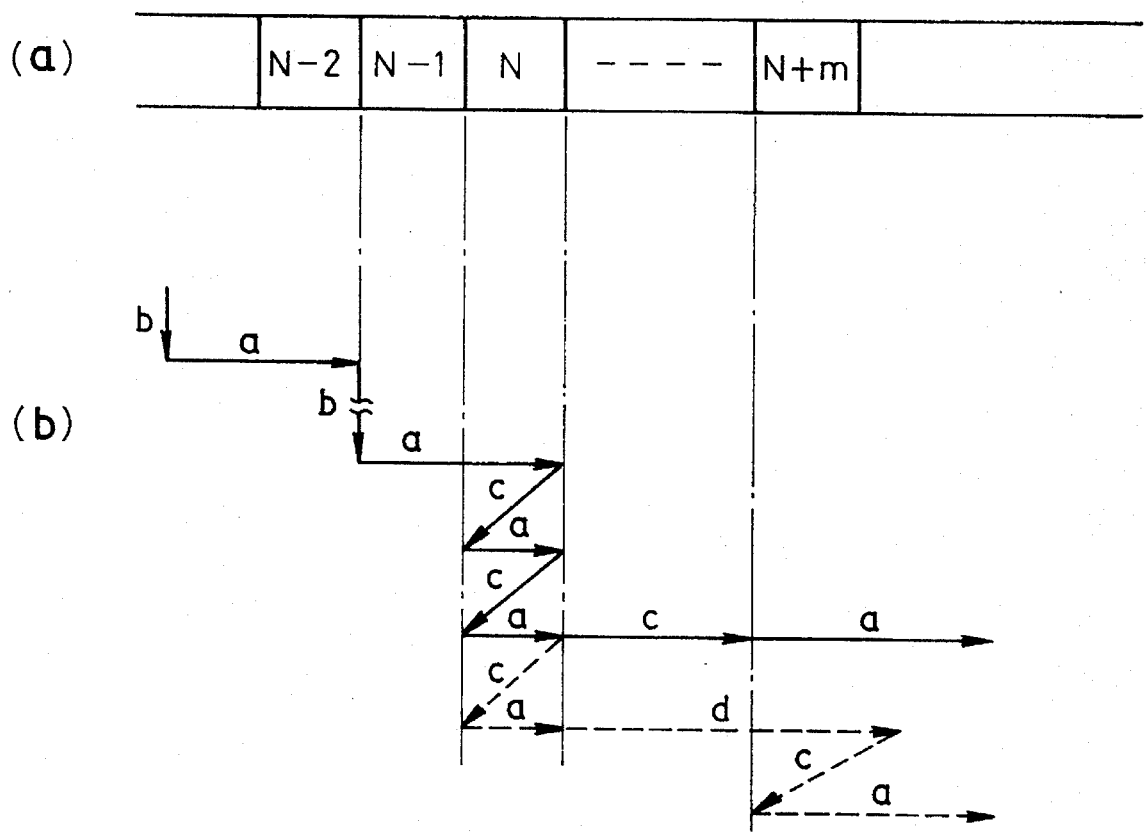
FIG. 6 is a diagram exemplifying the control operation in FIG. 5.
Figure 7:
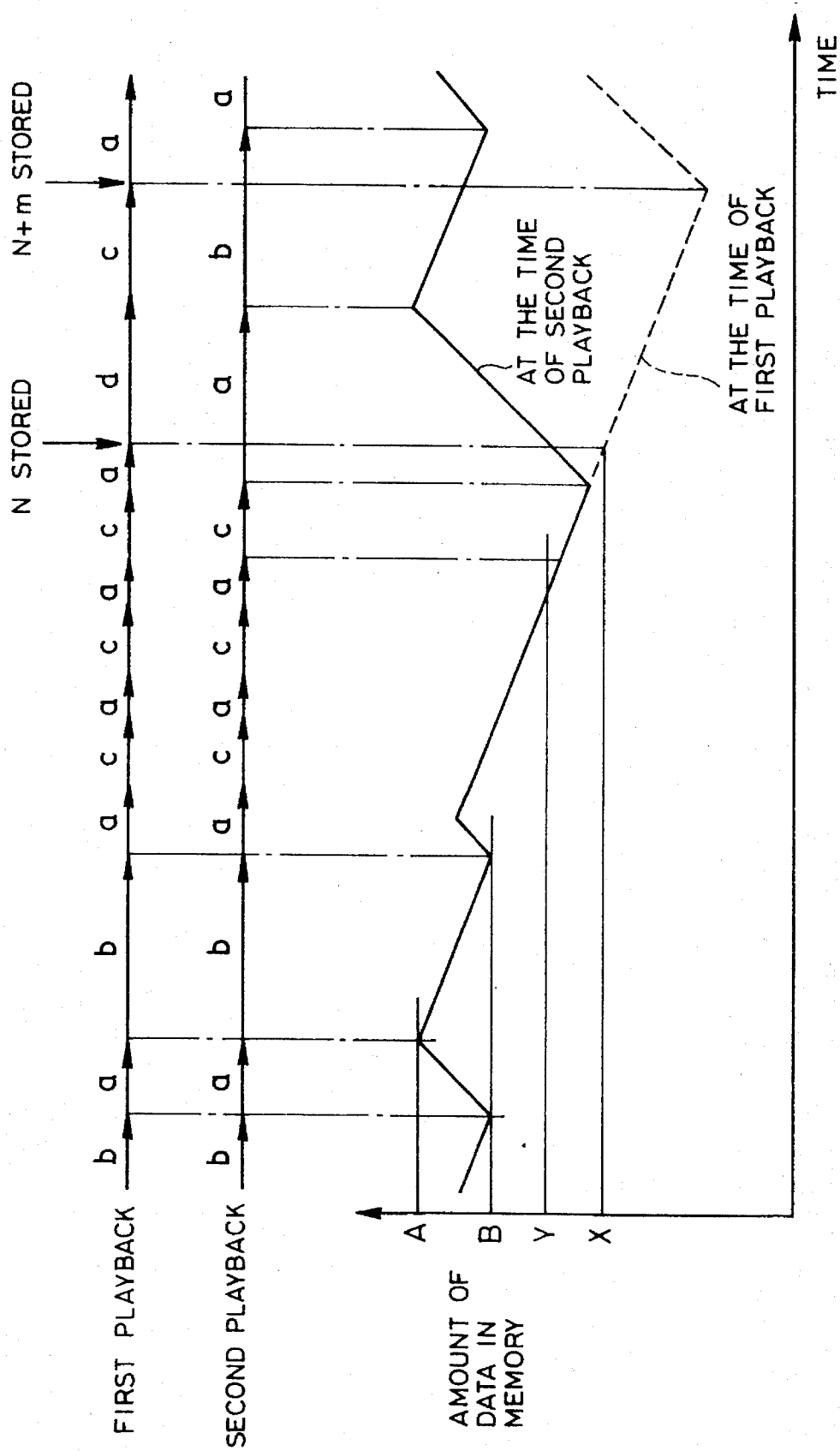
FIG. 7 is a diagram showing a change in the amount of remaining data in the memory in the operational example in FIG. 5.

The part (a) in FIG. 6 indicates the data recorded positions that are specified by addresses N−2, N−1, N, . . . , and N+m on a disk. In this case, as in the case of the part (a) in FIG. 2, correct data is not readable in the range from the address N to the address N+m−1. The part (b) in FIG. 6 indicates the chronological flow of the operation by the pickup 2 to access at the data recorded positions in the part (a) in FIG. 6 in accordance with the operation illustrated in FIG. 5. FIG. 7 shows the relationship between the chronological operational flow in the first playback and the second and later playbacks illustrated in FIG. 6 and the amount of remaining data in the memory 6. The operation in the first playback is the same as the one shown in the part (b) in FIG. 2 and FIG. 3. After a pause mode b is released at an earlier address than the address N−2, a data reading operation a is performed up to the address N−2. When data accumulated amounts to a predetermined value A which is close to the memory capacity of the memory 6, no further data can be written in the memory 6 so that the disk player enters the pause mode. When the amount of data in the memory 6 is reduced to a predetermined value B, the data reading operation starts again. After the reading of the data at the address N–2 is finished, the operation temporarily becomes the pause mode b and the data reading operation a starts again. When the data read position reaches the address N, the reading operation cannot be performed properly so that the address N is detected by a searching operation c after which the reading operation a for the address N starts again. If the data at the address N is actually unreadable, a retry operation is performed to repeat the data reading operation a and the searching operation c as indicated by the broken lines in the part (b) in FIG. 6. When the amount of remaining data in the memory 6 becomes smaller than the predetermined value X, this address N is stored as Ax, the reading operation a for the address N is interrupted and a jumping operation d takes place to search out an address whose data is readable. When the address N+m is detected as the address whose data is readable, this address is stored as the address Bx and the data reading operation a starts.

In the case where data at the address N cannot be read correctly in the second playback, when the amount of remaining data in the memory 6 is equal to or greater than the predetermined value Y, the retry operation is performed. When the amount of remaining data in the memory 6 is smaller than the predetermined value Y, on the other hand, the control proceeds to an operation for reading data at the address Bx without executing a retry operation for the address N.

In the first playback indicated by the broken line in FIG. 7, if the amount of remaining data in the memory 6 becomes smaller than the predetermined value X and the address N+m whose data is readable cannot be detected quickly, no data may not be left in the memory 6. In the second playback and later playbacks indicated by the solid lines, the amount of remaining data in the memory 6 never becomes smaller than the predetermined value X.

Figure 8:
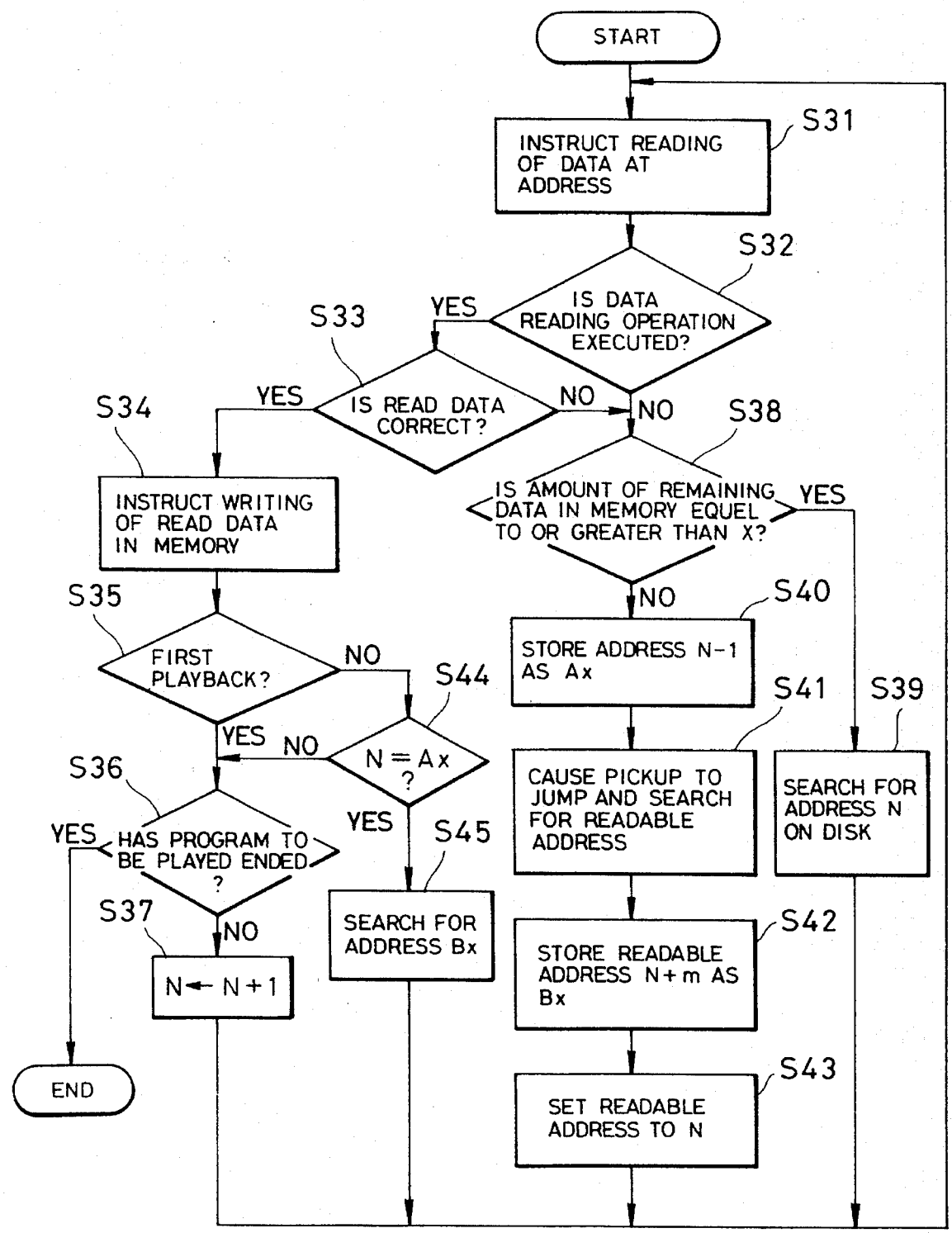
FIG. 8 is a flowchart for a data read control operation according to another embodiment, which is executed by the system controller in the player in FIG. 4.

FIG. 8 shows another operation of the system controller 9 as another embodiment of this invention. In this embodiment, steps S31 to S32 are the same as the aforementioned steps S1 to S3. When it is determined in step S33 that the read data is correct, the writing of the read data in the memory 6 is instructed by the memory controller 5 (step S34) and it is then determined if the playback of the disk 1 is the first playback (step S35). When it is the first playback, the system controller 9 determines if the program to be played back has been ended (step S36). When the program to be played back has not been ended, the address N on the disk is incremented by "1" and the resultant address is set as a new address N (step S37) after which the flow returns to step S31. When the program to be played back is finished, this routine is terminated.

When it is determined in step S32 that the data reading operation has not been performed, it is determined if the amount of remaining data in the memory 6 is equal to or greater than the predetermined value X (step S38). When the read data is determined as being in error in step S33, the flow also proceeds to step S38. When it is determined in step S38 that the amount of remaining data in the memory 6 is equal to or greater than the predetermined value X, the system controller 9 allows the pickup 2 to search for the address N (step S39), and then returns to step S31 to read data at the address N.

When it is determined in step S38 that the amount of remaining data in the memory 6 is equal to or smaller than the predetermined value X, the address N–1 which is one address previous to the current address N is stored as Ax (step S40), and then the system controller 9 causes the pickup 2 to jump the addresses to search for an address whose data is readable (step S41). Thereafter, the address whose data is readable is stored as Bx (step S42), and the address is set as the address N (step S43) after which the processing returns to step S31.

When it is determined in step S35 that the current playback is the second playback or a later playback, it is determined if the read address N is the same as Ax (step S44). When N≠Ax, the flow proceeds to step S36. When N=Ax, on the other hand, the system controller 9 allows the pickup 2 to search for the address Bx on the disk (step S45). Then, the system controller 9 sets the address Bx as a new address N (step S46) after which the flow proceeds to step S31.

Figure 2:
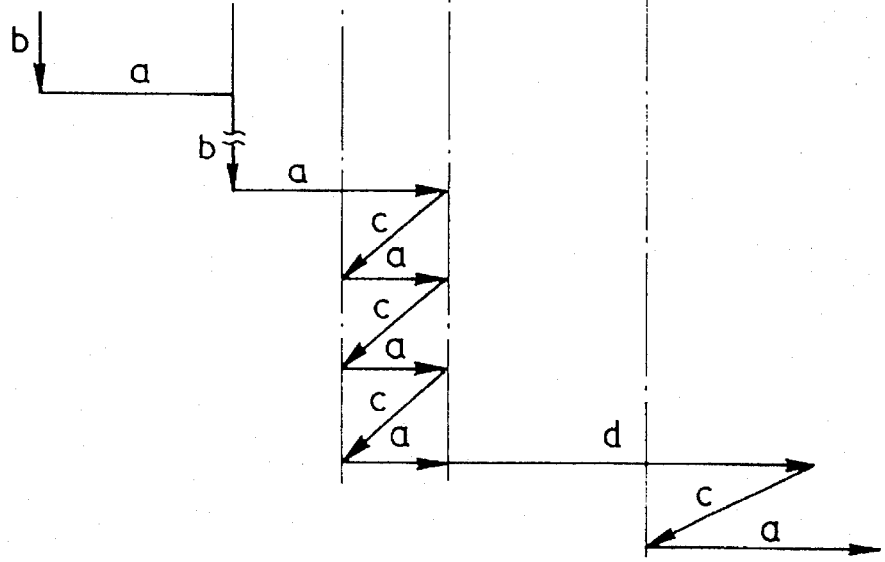
FIG. 2 is a diagram showing one example of the control operation in FIG. 1.
Figure 3:
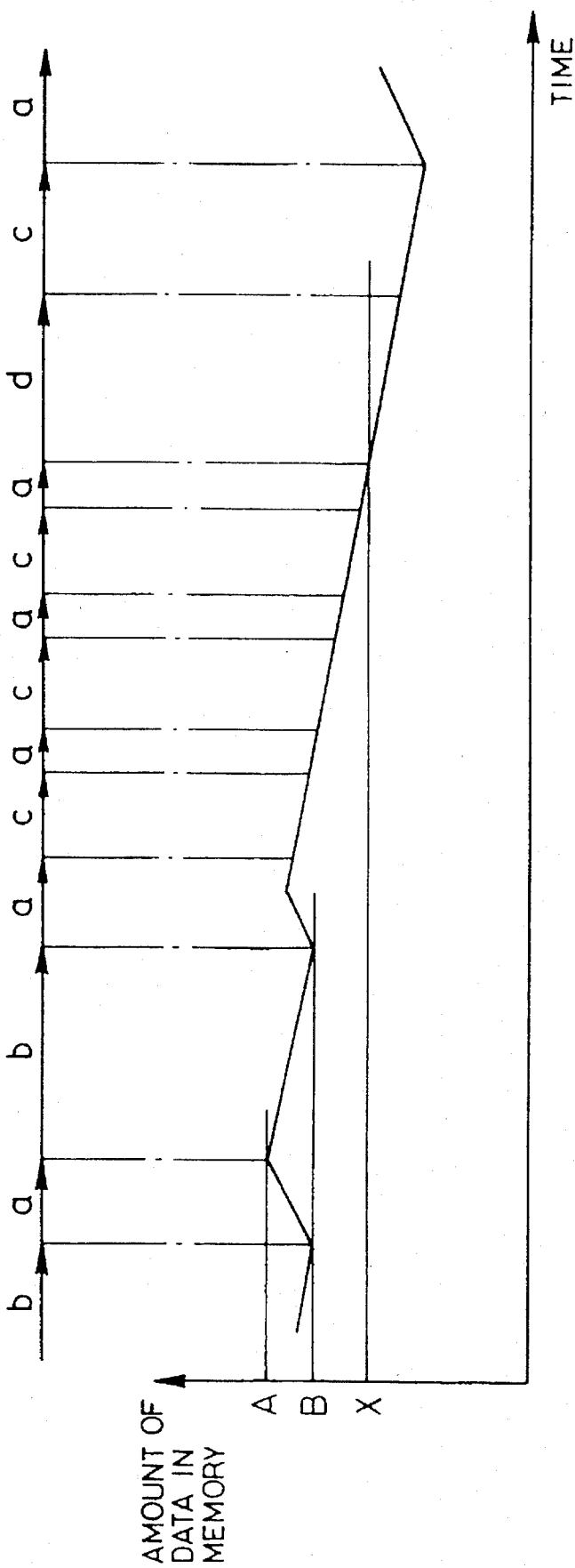
FIG. 3 is a diagram showing a change in the amount of remaining data in a memory in the operational example in FIG. 2.
Figure 10:
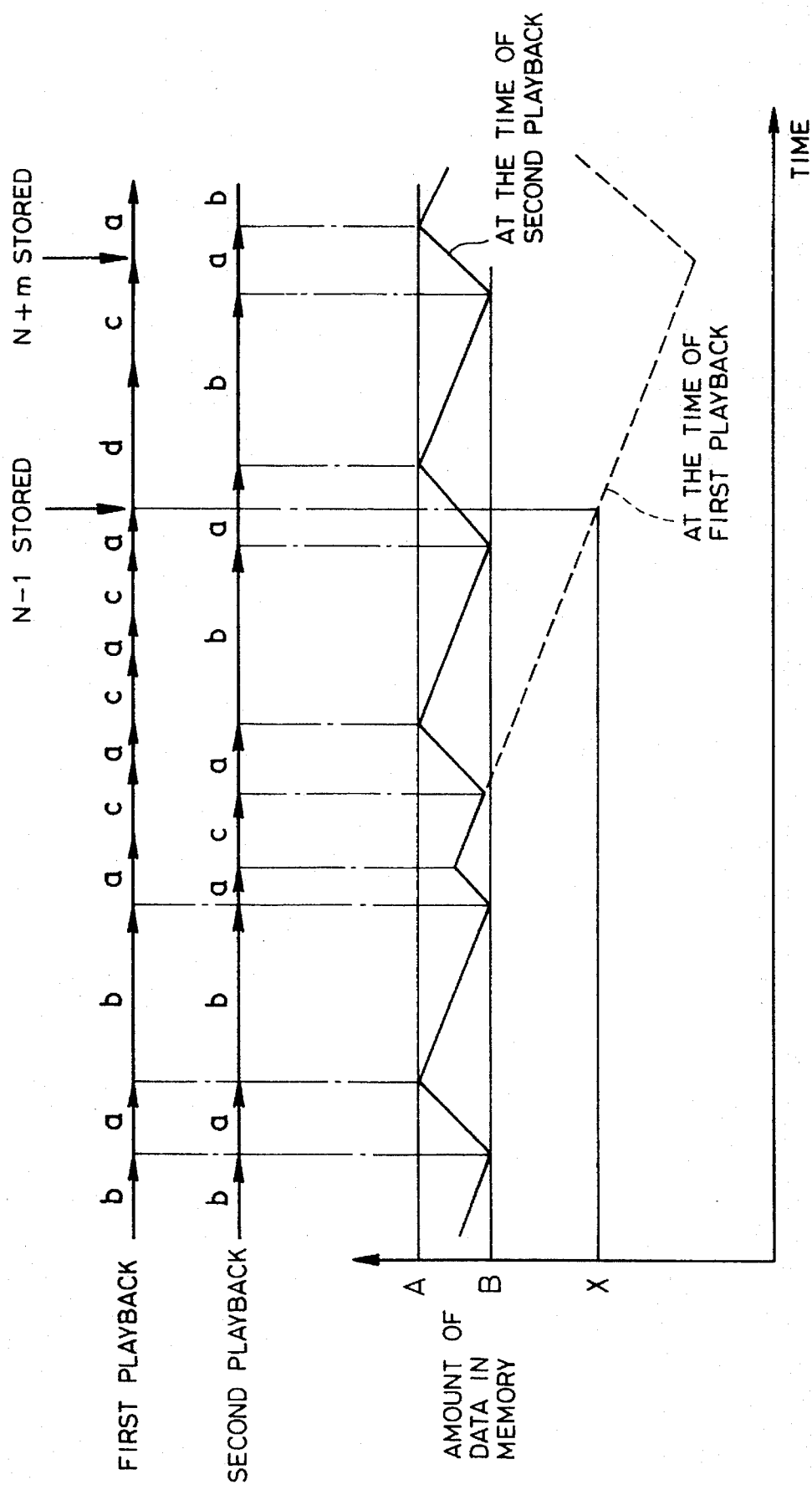
FIG. 10 is a diagram showing a change in the amount of remaining data in the memory in the operational example in FIG. 9.

Like the part (a) in FIG. 2 and the part (a) in FIG. 6, the part (a) in FIG. 9 indicates the data recorded positions that are specified by addresses N–2, N–1, N, ..., and N+m on a disk. In this case, correct data is not readable in the range from the address N to the address N+m–1. The part (b) and the part (c) in FIG. 9 respectively indicate the chronological flows of the operation by the pickup 2 to access at the data recorded positions in the part (a) in FIG. 9 at the time of the first playback and at the time of the second playback or a later playback, in accordance with the operation illustrated in FIG. 8. FIG. 10 shows the relationship between the chronological operational flows in the first playback and the second playback or a later playback illustrated in FIG. 9 and the amount of remaining data in the memory 6. The operation in the first playback is the same as the one shown in the part (b) in FIG. 2 and FIG. 3 or the part (b) in FIG. 6 and FIG. 7. When the reading of data at the address N–1 is ended in the second playback or a later playback, the address N+m as the address Bx is detected by the searching operation c. That is, no reading operation within the address range where correct data is unreadable is performed, and the data reading operation a for the address N+m is initiated after the searching operation for the address N+m is finished.

In the first playback indicated by the broken line in FIG. 10, if the amount of remaining data in the memory 6 becomes smaller than the predetermined value X and the address N+m whose data is readable cannot be detected quickly, no data may not be left in the memory 6. In the second playback and later playbacks indicated by the solid lines, the amount of remaining data in the memory 6 never becomes smaller than the predetermined value B.

In the above-described embodiments, the amount of remaining data in the memory 6 may be obtained from the difference between the read address on the disk and the read address from the memory 6.

Although the disk is not determined as having been played for the first time when the same disk is continuously played in those embodiments, the disk may not be determined as having been played for the first time even when this disk is temporarily removed from the disk player after being played once and is loaded in the same disk player again to be played back again. In this case, the address which causes a reading error should be stored until the next playback or semipermanently in association with the TOC on the disk.

Although the disk players of the above-described embodiments play mini disks, this invention may be adapted for any disk player which plays other disks like a compact disk, and reads data, read from a disk in a playback mode by the pickup, after temporary storage into the memory.

According to the disk player embodying this invention, when an address whose data is not correctly readable is present on a disk, the address information of that address is stored, and when the same disk is played again, the data reading operation for the new address is performed before the amount of remaining data in the memory becomes too small at the time the next reading address is address whose data is readable based on the address information. When at least the same disk is played again, therefore, the memory may not become empty, thus preventing a sound failure from occurring.

What is claimed is:

1. A disk player comprising:

reading means for reading data, recorded on a disk, for each predetermined block affixed with address information;

a memory for storing data read by said reading means;

memory control means for writing data into said memory when said data is correctly read, block by block, from said disk by said reading means, and, upon incorrect reading of data, inhibiting writing of said data into said memory and reading data from said memory at a speed slower than a writing speed;

means for detecting an amount of data still remaining in said memory after being written therein;

read control means for controlling said reading means in such a way as to read again data which has not been read correctly when said amount of remaining data is equal to or greater than a first predetermined value, and controlling said reading means in such a way as to read data at a new address when said amount of remaining data becomes smaller than said first predetermined value; and means for determining if it is a first playback for said disk, said read control-means including, means for storing, as an error data address, address information for data which has not been read correctly before said amount of remaining data becomes smaller than said first predetermined value when it is said first playback, and means for controlling said reading means in such a way as to read again data which has not been read correctly in a different playback from said first playback, when an address whose data has not been read correctly is equal to said error data address stored at a time of said first playback and said amount of remaining data is equal to or greater than a second predetermined value larger than said first predetermined value, and controlling said reading means in such a way as to read data at a new address when said amount of remaining data becomes smaller than said second predetermined value.

2. The disk player according to claim 1, wherein said read control means stores an address of data which follows data that has not been read correctly and which has been read correctly, as a correct data address in said first playback, and controls said reading means in such a way as to read data at said correct data address as data at said new address in a playback other than said first playback.

3. A disk player comprising:

reading means for reading data, recorded on a disk, for each predetermined block affixed with address information;

a memory for storing data read by said reading means;

memory control means for writing data into said memory when said data is correctly read, block by block, from said disk by said reading means, and, upon incorrect reading of data, inhibiting writing of said data into said memory, and reading data from said memory at a speed slower than a writing speed;

means for detecting an amount of data still remaining in said memory after being written therein;

read control means for controlling said reading means in such a way as to read again data which has not been read correctly when said amount of remaining data is equal to or greater than a predetermined value, and controlling said reading means in such a way as to read data at a new address when said amount of remaining data becomes smaller than said predetermined value; and means for determining if it is a first playback for said disk, said read control means including, means for storing address information for data which has not been read correctly before said amount of remaining data becomes smaller than said predetermined value when it is said first playback, means for determining if next data is correctly readable based on said address information in a different playback from said first playback, and means for controlling said reading means in such a way as to read data at a new address without reading said next data when said next data has not been determined as having not been read correctly.

* * * * *